Oct. 26, 1965 YOSHIRO NAKAMATSU 3,214,175

SOUND RECORDING SYSTEM

Filed Feb. 1, 1961 3 Sheets-Sheet 1

United States Patent Office
3,214,175
Patented Oct. 26, 1965

3,214,175
SOUND RECORDING SYSTEM
Yoshiro Nakamatsu, 62 Shimoumacho-2-chome, Setagaya-ku, Tokyo, Japan
Filed Feb. 1, 1961, Ser. No. 86,364
Claims priority, application Japan, Feb. 4, 1960, 35/3,435; Feb. 5, 1960, 35/3,146
16 Claims. (Cl. 274—4)

The present invention relates to a system for recording and reproducing sound on recording sheets.

The present invention has for its object to provide a recording sheet adapted to record and reproduce sound along a spiral track or tracks on such recording sheet.

Another object of the present invention is to provide an apparatus for recording and reproducing sound employing such magnetic recording sheet.

A further object of the present invention is to provide an apparatus for erasing and copying the record as formed on the above magnetic sheet.

According to the present invention, there is provided an apparatus for recording and reproducing sound on magnetic sheets comprising a transducer head and means for moving said transducer head relative to a magnetic sheet along a spiral path thereon having opposite ends smoothly connected to each other.

According to another aspect of the present invention, there is provided a magnetic sheet adapted to be used with the sound recording and reproducing apparatus described and carrying magnetic elements having respective axes oriented in a required two-dimensional direction or plural dimensional direction.

The present invention will now be described with reference to the accompanying drawings which illustrate one embodiment of the present invention and in which parts unnecessary for the understanding of the present invention are omitted for clarity. In the drawings.

Figure 1:
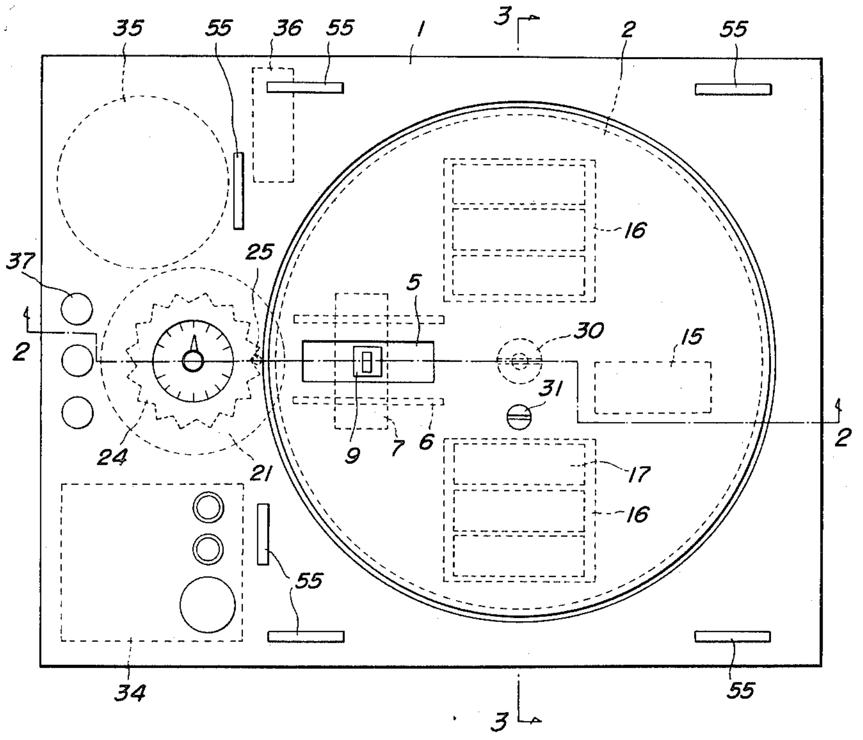
FIG. 1 is a plan view of a sound recording and reproducing apparatus according to the present invention.
Figure 9A:
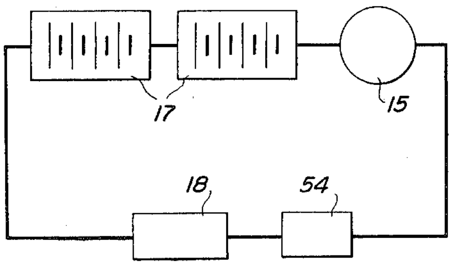
Figure 9B:
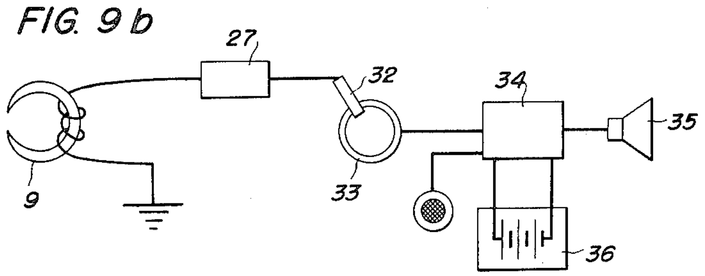

FIGS. 9*a* and 9*b* are diagrams illustrating the circuits of the sound recording and reproducing apparatus shown in FIG. 1, for the driving mechanism and the sound recording and reproducing part of the apparatus, respectively.

Figure 2:
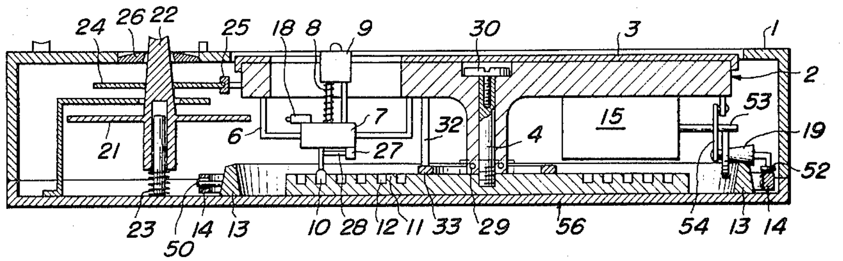
FIG. 2 is a cross-sectional view taken along the line 2—2 in FIG. 1.
Figure 3:
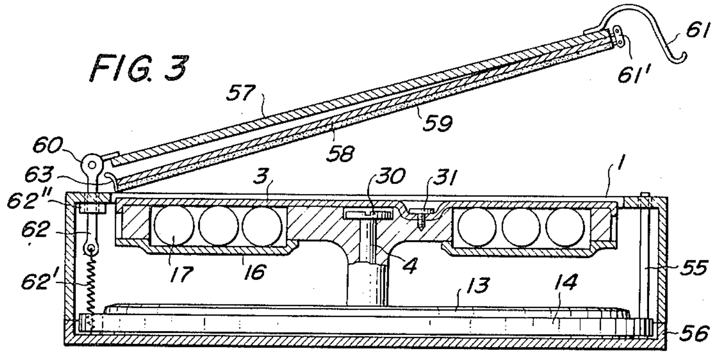
FIG. 3 is a cross-sectional view taken along the line 3—3 in FIG. 1.
Figure 5:
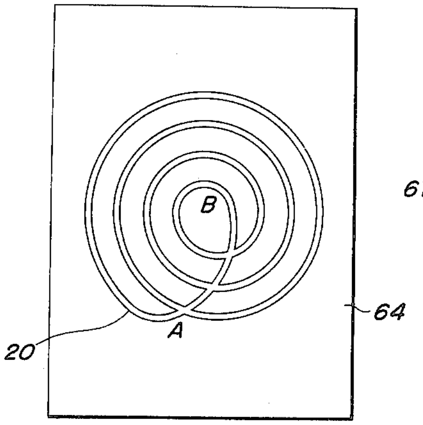
FIG. 5 is a plan view of a magnetic sheet according to the present invention illustrating a recording track on the sheet.

Referring to the drawings, particularly to FIGS. 1 to 3, there is shown a sound recording and reproducing apparatus embodying the present invention which includes a casing having a top wall 1 formed with a round opening for accommodating a turntable 2 rotatably mounted on a stationary vertically extending shaft 4, said top wall forming a platform for supporting a magnetic recording sheet as described hereinafter. Formed in the turntable 2 is a radially extending rectangular slot 5 with rails 6 secured to the table along the opposite side edges of said slot 5. Provided slidably along the rails 6 is a block 7 from the top of which two posts extend upwardly to carry an upwardly facing transducer head 9 for sliding movement therealong. The transducer head 9 is upwardly biased by a spring means so that the working part of the transducer head may be placed adjacent the lower surface of a magnetic sheet as positioned on the supporting plate or the top wall 1 of the casing. Vertically downwardly extending from the under surface of the block 7 is a shaft which carries at the bottom of a shoe 10 for free rotation about the shaft. The shoe 10 has opposite side faces curved so as to snugly fit in between the side walls of a groove 12 formed in the top of a disc-like member 11 for sliding movement along the groove 12. The disc-like member 11 is secured to the top surface of the bottom wall of the apparatus casing, as apparent in FIG. 2. The groove 12 is of a closed or endless spiral formation with the inner and outer ends of the groove interconnected by a smoothly curved connecting portion thereof, as shown in FIG. 5 and described later, so as to cause the shoe 10 and hence the transducer head 9 to be moved radially along the groove 12 as the turntable 2 is rotated. Provided around the disc-like member 11 concentrically therewith are a stationary ring 13 and a vertically movable ring 14. Secured to the underside of the turntable is an electric motor 15 for driving the turntable 2 with battery casings 16 containing electric batteries 17 for energizing the motor also secured to the underside of the turntable. The motor 15 is energized by said batteries through a stop motion switch 18. The rotation of the motor is transmitted through the shaft 53 thereof to a speed reducing gear 19 formed of rubber and carried by a support plate 52. The speed reducing gear 19 has a reduced portion arranged to run along the top of the stationary ring 13 thereby to rotate the turntable 2. It will be recognized that as the turntable 2 is rotated, the shoe 10 is moved under the control of the groove 12 as desecribed to cause the transducer head 9 to move defining a track 20 as shown in FIG. 5. It is arranged so that, as the head 9, starting at point A in FIG. 5, moves along the spiral path to point B and back to point A, the block 7 runs to the left as viewed in FIG. 2 to a point at which the switch 18, being secured to the block 7, strikes the periphery of a horizontally disposed disc 21 to be opened to stop the motor and hence the turntable. The disc 21 is secured to a shaft 22 which in turn is rotatably mounted on a stationary rod vertically extending from the upper surface of the bottom plate of the apparatus casing and is upwardly biased by a spring means 23 to a position where the peripheral surface of the disc 21 is in registry with the switch 18. As will be observed, when the shaft 22 is pressed down manually, the engagement between the disc 21 on the shaft 22 and the switch 18 is released to close the switch 18 thereby to start the motor 15. Also mounted on the shaft 22 of the disc 21 is a gear-like plate 24 adapted to be engaged by a lug 25 formed on the turntable 2 so as to be driven by a distance corresponding to one graduation of a stationary scale means for each revolution of the turntable 2 for continuously indicating the position of the transducer head 9. Numeral 26 designates a viewing window carrying such scale to cooperate with a pointer provided on the gear-like plate 24.

Referring now to FIG. 5, as the transducer head 9 returns from point B to point A along the joining portion of the track, it will be observed that the head intersects or passes across the spiral portion of the track. In this connection, if the angle of intersection exceeds approximately 30 degrees, the sound recorded along the joining portion of the track may be effectively reproduced distinctly from that recorded on the spiral track portion. If, however, the angle is approximately 30 degrees or less, there exists a tendency of some cross talking taking place. For this reason, the recording and reproduction is desirably cut or interrupted during the returning travel from point B to point A. For the purpose, formed on a shank portion of the shoe 10 is an arm 28 which acts to open a head circuit switch 27 when the arm is swung by the increase in angle of rotation of the shoe about the axis thereof which occurs when the shoe 10 runs from point B to point A.

The turntable 2 is circular and formed with a rectangular slot 5 for receiving the transducer head and recesses for accomodating the battery casings 16. The turntable is mounted on a stationary shaft 4 for rotation thereon. Numeral 29 designates a thrust bearing and numeral 30 a screw for securing the turntable 2 in place on the shaft 4. The battery casings 16 are each open at the top and a disc 3, serving as a battery casing cover, is secured to the turntable 2 by a screw 31 so as to cover the entire surface of the turntable 2, said disc 3 being only opened over an area thereof corresponding to the rectangular slot 5 for receiving the transducer head.

Figure 4:
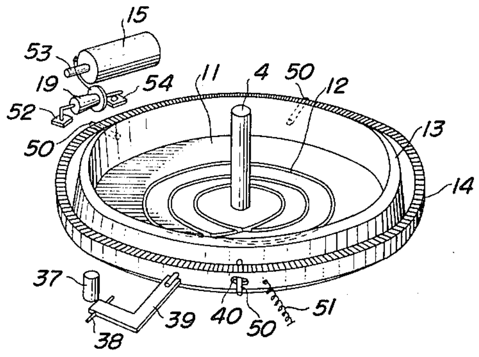
FIG. 4 is a perspective view of the mechanism for momentary stoppage in the apparatus shown in FIG. 1.

A lead wire from the transducer head 9 is connected through a switch 27 to a slipper 32 arranged so as to run over a stationary slip ring 33, which in turn is connected to an amplifier oscillator 34 and a speaker 35. Numeral 36 denotes a battery case for the amplifier and oscillator 34; and numeral 37 denotes a push button for momentary stoppage. The arrangement is such that depression of the push button 37 causes a lever 39 to be lifted pivotally about a pin 38, on which said lever 39 is mounted, to raise the vertically movable ring 14, as seen in FIG. 4. The vertically movable ring 14 is formed with an inclined elongated slot 40 which receives a stationary pin 50 secured to the stationary ring 13. As the push botton 37 is released to rise, a spring 51 acts to lower the vertically movable ring 14 back to its lower position. When the vertically movable ring 14 is raised, the top surface thereof pushes up a support plate 52 for the shaft of the rubber speed reducing gear 19 thereby to disengage the latter from the shaft 53 of the motor 15 and the surface of stationary ring 13 while at the same time actuating a motor switch 54 to open to stop the rotation of the motor 15. The purpose of the disengagement of the rubber speed reducing wheel 19 from the motor shaft 53 and the surface of stationary ring 13 is to prevent permanent deformation of the rubber wheel 19 and/or to stop the turntable 2 momentarily. The top surface of the vertically movable ring 14 is knurled to prevent slippage of the support plate 52 so that the turntable is held stationary when the apparatus is stopped. The motor 15 circuit leads from the batteries 17 through the switches 18 and 54 to the motor 15.

As described above, a recording sheet is placed on the top wall of the casing 1, which is provided with positioning lugs 55, as described in FIG. 1, in positions corresponding to those of three sides of the recording sheet as mounted for the purpose of positioning the latter on the mounting base 1. Since the lugs 55 need to have a maximum accuracy, they are preferably formed to extend upright from the base or bottom wall 56 of the casing of the apparatus, as shown in FIG. 3.

The recording sheet, after being mounted on the top wall of the casing 1, is pressed downwardly against the latter by a presser device which includes a laminated assembly comprising a transparent plate 57, an opaque hard plate 58 and an opaque resilient plate 59 and loosely pivoted to the body of the apparatus by means of a hinge 60 for free opening and closing movement. The hinge 60 is constructed in such a manner as to be vertically moved along a guide 62″ as the hinge opens or closes and is normally urged downwardly by a spring 62′. This presser device thus functions to press a stack of sound recording sheets together and against the top wall of the casing or mounting base 1 while allowing successive withdrawal of the stacked sheets in succession at the bottom of the stack so that recording and reproduction may be continued for a long period of time. Numeral 61 denotes a clip for securing the presser assembly to the casing 1 of the apparatus. The presser assembly presses the magnetic recording sheets, as described, with the resilient plate 59, formed, for example, of foam plastic, in direct contact with the recording sheet. This enables sound recording and reproduction of higher fidelity than with the case where a recording sheet is pressed simply by a transparent presser plate. The resilient plate 59 is secured to the transparent presser plate 57 by means of a hinge 61′ and a clip 63, enabling the operator to perform sound recording and reproduction while viewing the recording sheet through the transparent presser plate 59, as desired, by first disengaging the clip 63 and then opening the resilient plate 59. It will be readily seen that the resilient plate 59 may also be rotated onto the top side of the transparent presser plate 57 so that the opaque hard plate 58 carrying the resilient plate 59 comes to an exposed top position to serve as a guard for protecting the transparent plate 57 and the transducer head 9 while the apparatus is carried from place to place or is in storage.

Figure 7:
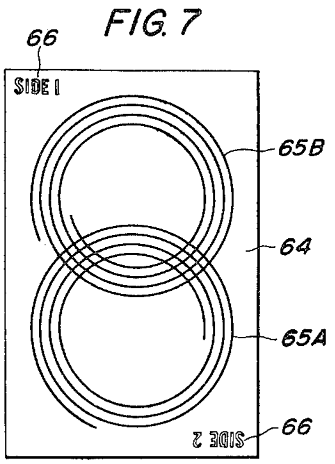
FIG. 7 is a plan view of a magnetic sheet according to the present invention having a pair of tracks for duplex recording.

The sound recording sheet of the present invention comprises a rectangular magnetic sheet of paper 64 carrying a closed or endless spiral track A–B–A thereon, as indicated at 20 in FIG. 5. Since the turntable in the apparatus according to the invention has its center disposed eccentrically with respect to the center of the recording sheet 64, the recording operation may be repeated on the same recording sheet, previously subjected to such recording operation, by placing the sheet bottom up on rotating the sheet through 180 degrees, resulting in the formation of two overlapped spiral tracks 65A, 65B, as shown in FIG. 7. It has been found that these tracks may each be independently reproduced with distinctness. For this purpose, it is preferable that the recording sheet carries imprinted markings 66, such as "Side 1" and "Side 2," for identifying the top and bottom of the sheet.

Figure 6:
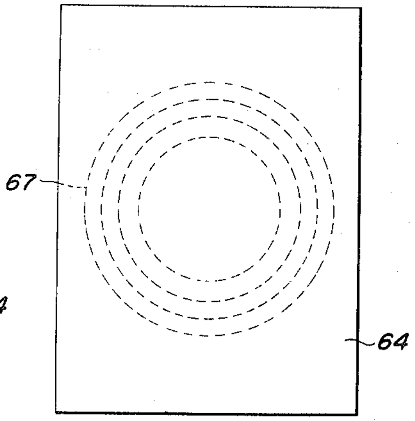
FIG. 6 is a view similar to FIG. 5, but illustrating the orientation of the magnetic axes of magnetic elements on the sheet.

The sound track of the present invention is circular and thus it is possible to improve the sensitivity and sound quality of the sheet by orienting the direction of the magnetic crystals thereon, for instance $Fe_2O_3$ or $\gamma = Fe_3O_4$ concentric circumferential directions as indicated at 67 in FIG. 6. In contrast with the unidirectional orientation, which has previously been well known in the art, the orientation employed according to the present invention is two-dimensional. In practice, such two-dimensional orientation may be obtained by bringing a coil means, having a ring core outlined substantially the same as the desired area of orientation 67 and carrying conductors wound thereabout, close to the sheet immediately after the latter has been coated with the magnetic material. In this connection, the magnetic coating on the sheet of the present invention may be formed by printing or roller coating, but it is proposed to form such magnetic coatings during the process of paper making by admixing magnetic particles in place of clay as used in processing art paper.

Figure 8:
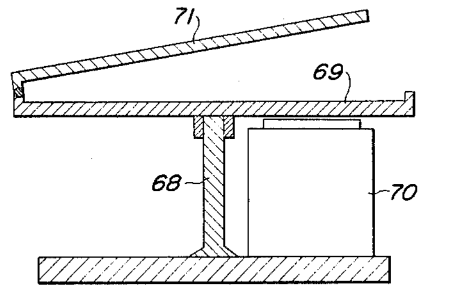
FIG. 8 is an elevational view of an apparatus for erasing and reproducing the record carried on a magnetic sheet.

In order to erase the sound record on the recording sheet according to the present invention, a simple system may be utilized which includes a coil device provided with a switch means and adapted to be energized to rub the sheet surface. The magnetic sound record may alternatively be erased by a means as shown in FIG. 8, which comprises a rectangular base 69 rotatably mounted on a shaft 68 and a magnetic flux producing coil 70 disposed beneath the rotatable base 69 adapted to produce a magnetic flux sufficient to erase the sound record. It will be understood that the recording sheet to be erased is placed on the rotatable base 69 and held in place by a cover 71 pivoted thereto. This eraser means may also serve as a sound copying device by suitably adjusting the magnetic flux of the coil 70. On this occasion, the master sheet and a slave sheet are placed on the rotatable base 69 with the magnetic film areas of the two sheets registered with each other, and then the sheets are pressed together by the cover 71 for rotation with the base 69 over the coil 70.

It will be recognized from the foregoing that the present invention provides an improved magnetic sheet recording and reproducing apparatus, magnetic sound recording sheets therefor, an eraser and a copying device, which all have a simplified, sturdy and economical construction and are very convenient and highly efficient.

What is claimed is:

1. An apparatus for recording and reproducing sound on a magnetic sheet, comprising a casing having a sheet supporting surface, means for holding a sheet in place on said sheet supporting surface of said casing, a turntable rotatable about an axis fixed relative to said casing and extending normal to said sheet supporting surface, a transducer head mounted on said turntable movably relative thereto, a motor means mounted on said turntable for driving the latter to move said transducer head along a closed spiral guide groove fixed to the casing, and means including an index element rotatable by engagement of the edge of said turntable for indicating the position of said transducer head.

2. An apparatus for recording and reproducing sound on a magnetic sheet, comprising a casing have a sheet supporting plate, means for holding the sheet in place on said sheet supporting plate of said casing, a turntable rotatable about an axis fixed relative to said casing and extending normal to said sheet supporting plate, a transducer head mounted on said turntable movably relative thereto, and a motor means mounted on said turntable for driving the latter to move said transducer head along a closed spiral groove fixed to said casing, said sheet holding means comprising stop elements secured to said casing adjacent to the edges of said sheet thereon for positioning the latter and a presser plate means for pressing said sheet against said sheet supporting plate of said casing.

3. An apparatus for recording and reproducing sound on a magnetic sheet, comprising a casing having a sheet supporting surface, means for holding the sheet in place on said sheet supporting surface of said casing a turntable rotatable about an axis fixed relative to said casing and extending normal to said sheet supporting surface, a transducer head mounted on said turntable movably relative thereto, a motor means mounted on said turntable for driving the latter to move said transducer head along a closed spiral guide groove fixed to said casing, and a switch means movable integrally with said transducer head and adapted to be opened to deenergize an electric circuit of said motor means thereby to stop said turntable and closed to start the rotation of the latter.

4. An apparatus for recording and reproducing sound on a magnetic sheet, comprising a casing having a sheet supporting plate, means for holding said sheet in place on said sheet supporting plate, a turntable rotatable about an axis fixed relative to said casing normally to said sheet supporting plate, a transducer head mounted on said turn table movably relative thereto, and a motor means mounted on said turntable for driving the latter to move said transducer head along a closed spiral groove fixed to said casing, said sheet holding means comprising stop elements secured to said casing adjacent to said edges of said sheet thereon for positioning the latter and a presser plate means for pressing said sheet against said sheet supporting plate of said casing, said sheet supporting plate having formed therein a circular opening in which said turntable is disposed under said sheet supporting plate in parallel therewith.

5. An apparatus for recording and reproducing sound on magnetic sheets, comprising a casing having a sheet supporting plate, means for holding said sheets in superposition on said sheet supporting plate, a turntable rotatable about an axis fixed relative to said casing normally to said sheet supporting plate, a transducer head mounted on said turntable movably relative thereto, a motor means mounted on said turntable for driving the latter to move said transducer head along a closed spiral groove fixed to said casing, said sheet holding means comprising stop elements secured to said casing adjacent to said edges of said sheets thereon for positioning the latter and a presser plate means for pressing said sheets against said sheet supporting plate of said casing, said sheet supporting plate having formed therein a circular opening in which said turntable is disposed under said sheet supporting plate in parallel therewith, whereby either sound recording or reproducing operation may be continually performed by successively withdrawing said sheets as they are operated one by one.

6. An apparatus for recording and reproducing sound on a magnetic sheet, comprising a casing having a sheet supporting plate, means for holding the sheet in place on said sheet supporting plate of said casing, a turntable rotatable about an axis fixed relative to said casing and extending normal to said sheet supporting plate, a transducer head mounted on said turntable for movement relative thereto, and a motor means mounted on said turntable for driving the latter to move said transducer head along a closed spiral groove fixed to said casing, said sheet holding means comprising stop elements secured to said casing adjacent to the edges of said sheet thereon for positioning the latter and a presser plate means for pressing said sheet against said sheet supporting plate, said presser plate means being hingeably and vertically resiliently movably connected to said casing so as to be movable to a position substantially normal to the plane of said sheet supporting plate.

7. An apparatus for recording and reproducing sound on a magnetic sheet, comprising a casing having a sheet supporting plate, means for holding the sheet in place on said sheet supporting plate, a turntable rotatable about an axis fixed relative to said casing and extending normal to said sheet supporting plate, a transducer head mounted on said turntable for movement relative thereto, and a motor means mounted on said turntable for driving the latter to move said transducer head along a closed spiral groove fixed to said casing, said sheet holding means comprising stop elements secured to said casing adjacent to the edges of said sheet thereon for positioning the latter and a presser plate means for pressing said sheet against said sheet supporting plate, said presser plate means comprising a cushioning member of foam plastic on that side of the presser plate means which is adapted to contact said sheet on the casing.

8. An apparatus for recording and reproducing sound on a magnetic sheet, comprising a casing having a sheet supporting plate, means for holding the sheet in place on said sheet supporting plate, a turntable rotatable about an axis fixed relative to said casing and extending normal to said sheet supporting plate, a transducer head mounted on said turntable for movement relative thereto, and a motor means mounted on said turntable for driving the latter to move said transducer head along a closed spiral groove fixed to said casing, said sheet holding means comprising stop elements secured to said casing adjacent to the edges of said sheet thereon for positioning the latter and a presser plate means for pressing said sheet against said sheet supporting plate, said presser plate comprising a lamination of a removable opaque plate and a transparent plate, the order of the lamination of which plates is changeable.

9. An apparatus for recording and reproducing sound on a magnetic sheet, comprising a casing having a sheet supporting plate, means for holding the sheet in place on said sheet supporting plate, a turntable rotatable about an axis fixed relative to said casing and extending normal to said sheet supporting plate, a transducer head mounted on said turntable for movement relative thereto, and a motor means mounted on said turntable for driving the latter to move said transducer head along a closed spiral groove fixed to said casing, said sheet holding means comprising stop elements secured to said casing adjacent to the edges of said sheet thereon for positioning the latter and a presser plate means for pressing said sheet against said sheet supporting plate, it being arranged so that said sheet may be secured in place so as to partially extend beyond said presser plate and casing means.

10. An apparatus for recording and reproducing sound on a magnetic sheet, comprising a casing having a sheet supporting surface, means for holding the sheet in place on said sheet supporting surface of said casing, a turntable rotatable about an axis fixed relative to said casing and extending normal to said sheet supporting surface, a transducer head mounted on said turntable movably relative thereto, a motor means mounted on said turntable for driving the latter to move said transducer head along a closed spiral guide groove fixed to said casing, a switch means movable integrally with said transducer head and adapted to be opened to deenergize an electric circuit of said motor means thereby to stop said turntable and be closed to start the rotation of the latter, and means including an index element rotatable by engagement with the edge of the turntable for indicating the position of said transducer head, the shaft of a member engageable with said switch means to open and close the latter being arranged for vertical movement and carrying said indicating means.

11. An apparatus for recording and reproducing sound on a magnetic sheet, comprising a casing having a sheet supporting surface, means for holding the sheet in place on said sheet supporting surface of said casing, a turntable rotatable about an axis fixed relative to the casing and extending normal to said sheet supporting surface, a transducer head mounted on said turntable movably relative thereto, a motor means mounted on said turntable for driving the turntable to move said transducer head along a closed spiral guide groove fixed to the casing, and a guide shoe mounted rotatably on a shaft secured to said transducer head and adapted to slidably engage the side walls of said groove for directing said transducer head along said closed spiral groove, said guide shoe having opposite side faces curved so as to fit the side walls of the groove and being held against rotation within said closed spiral groove.

12. An apparatus for recording and reproducing sound on a magnetic sheet, comprising a casing having a sheet supporting surface, means for holding the sheet in place on said sheet supporting surface of said casing, a turntable rotatable about an axis fixed relative to the casing and extending normal to said sheet supporting surface, a transducer head mounted on said turntable movably relative thereto, a motor means mounted on said turntable for driving the turntable to move said transducer head along a closed spiral guide groove fixed to the casing, and a battery means mounted on said turntable for energizing said motor.

13. An apparatus for recording and reproducing sound on a magnetic sheet, comprising a casing having a sheet supporting surface, means for holding the sheet in place on said sheet supporting surface of said casing, a turntable rotatable about an axis fixed relative to the casing and extending normal to said sheet supporting surface, a transducer head mounted on said turntable movably relative thereto, a motor means mounted on said turntable for driving the turntable to move said transducer head along a closed spiral guide groove fixed to the casing, and a cover means arranged to cover said turntable in close contact with the top surface thereof, said cover means being adapted to be at least partially removed.

14. An apparatus for recording and reproducing sound on a magnetic sheet, comprising a casing having a sheet supporting surface, means for holding the sheet in place on said sheet supporting surface of said casing, a turntable rotatable about an axis fixed relative to the casing and extending normal to said sheet supporting surface, a transducer head mounted on said turntable movably relative thereto, a motor means mounted on said turntable for driving the turntable to move said transducer head along a closed spiral groove fixed to the casing, and a driving wheel adapted to be driven by said motor for driving said turntable, an annular rail on which said driving wheel travels, and vertically movable ring means disposed substantially concentrically with said turntable, and engageable with said driving wheel to displace the same such that engagement between said driving wheel and said rail is interrupted by upward movement of said ring means and is effected by downward movement thereof.

15. Apparatus for recording and reproducing sound on a flat stationary magnetic recording sheet, said apparatus comprising a turntable having a radially extending slot, a stationary plate beneath said turntable and having a guide groove, transducing means guided in said slot for cooperating with the lower surface of a magnetic sheet placed above said turntable, and means supporting said transducing means and engaged in said groove in the plate for displacing the transducing means in said slot as said turntable rotates.

16. Apparatus according to claim 15 comprising a casing having a sheet supporting surface, means for holding the sheet in place on said sheet supporting surface, and motor means mounted on said turntable for driving the turntable to move said transducer head along said groove, said groove forming a closed spiral.

References Cited by the Examiner

UNITED STATES PATENTS

| | | | |
|---|---|---|---|
| 671,513 | 4/01 | Goold | 274—13 |
| 1,046,650 | 12/12 | Rotheudt | 274—42 |
| 1,940,274 | 12/33 | Severy | 179—100 |
| 2,519,568 | 8/50 | Handschin | 179—100 |
| 2,562,665 | 7/51 | Grimm | 274—13 |
| 2,782,043 | 2/57 | Andrews | 274—41 |
| 2,840,642 | 6/58 | Camras | 274—4 |
| 2,869,878 | 1/59 | Camras | 274—41 |
| 2,973,410 | 2/61 | Hoshino et al. | 179—100 |
| 2,975,238 | 3/61 | Jones | 274—4 |
| 3,000,638 | 9/61 | Dennis | 274—4 |
| 3,074,724 | 1/63 | Fujimoto | 274—4 |

NORTON ANSHER, *Primary Examiner.*

NEWTON N. LOVEWELL, *Examiner.*